(No Model.)
G. W. CONDERMAN.
HOT AND COLD WATER SUPPLY FOR WASH TRAYS, LAUNDRY TUBS, &c.
No. 566,296. Patented Aug. 25, 1896.
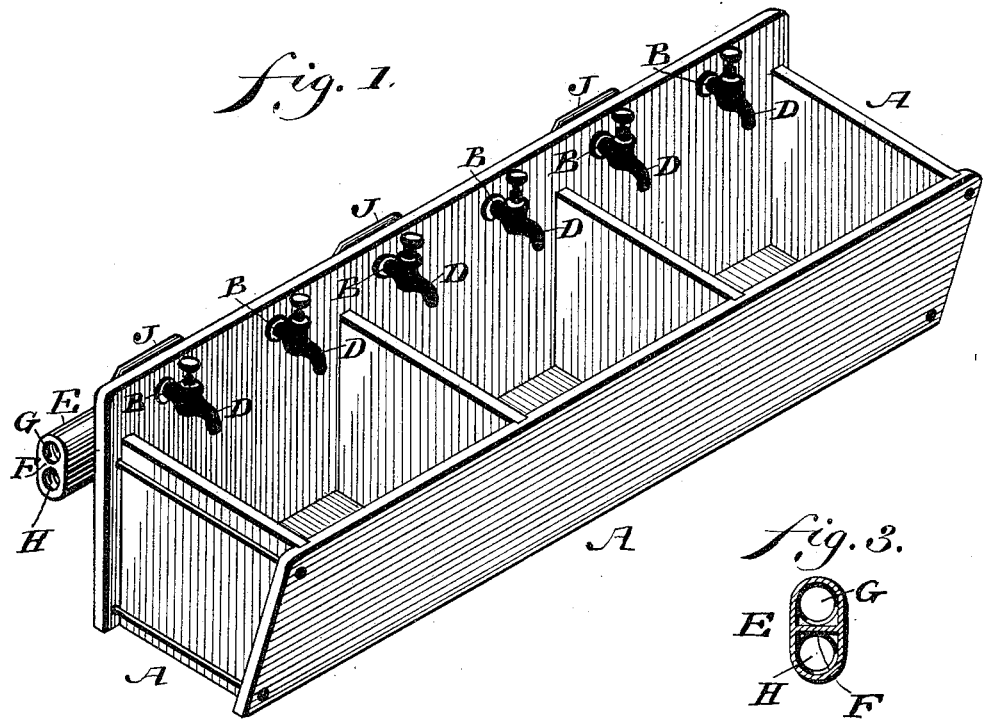
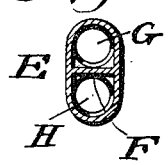
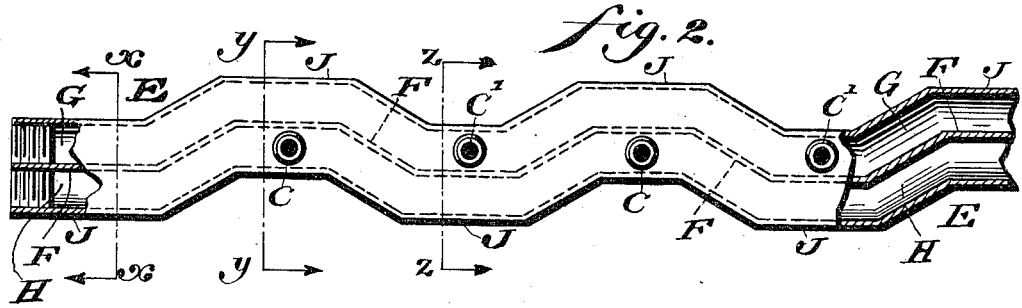
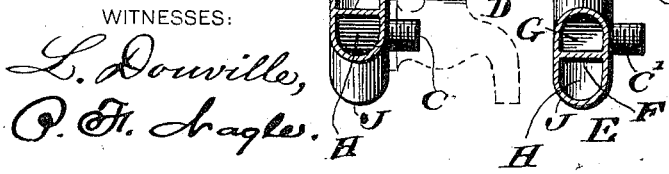

UNITED STATES PATENT OFFICE.

GEORGE W. CONDERMAN, OF PHILADELPHIA, PENNSYLVANIA.

HOT AND COLD WATER SUPPLY FOR WASH-TRAYS, LAUNDRY-TUBS, &c.

SPECIFICATION forming part of Letters Patent No. 566,296, dated August 25, 1896.

Application filed October 11, 1895. Serial No. 565,345. (No model.)

*To all whom it may concern:*

Be it known that I, GEORGE W. CONDERMAN, a citizen of the United States, residing in the city and county of Philadelphia, State of Pennsylvania, have invented a new and useful Improvement in Hot and Cold Water Supply for Wash-Trays, Laundry-Tubs, &c., which improvement is fully set forth in the following specification and accompanying drawings.

My invention consists of a conduit formed with a longitudinal division therein and deflections at intervals in such a manner that outlets may be provided for the hot and cold water through the sections of the conduit in the same right line, thus adapting the back of a tub, tray, &c., to have the spigots or faucets attached thereto in a uniform, convenient, or expeditious manner.

Figure 1 represents a perspective view of a laundry-tub having a water supply embodying my invention. Fig. 2 represents a partial side elevation and partial longitudinal section of the conduit or supply embodying my invention. Figs. 3, 4, and 5 represent sections thereof, respectively on lines $x$ $x$, $y$ $y$, and $z$ $z$, Fig. 2.

Similar letters of reference indicate corresponding parts in the several figures.

Referring to the drawings, A designates a laundry or stationary wash-tub whose back is provided with openings B therein for the nipples C C', to which the spigots or faucets D are attached, said nipples being connected to the outlets of the conduit E, which is composed of a tube constructed with a longitudinally-extending partition F therein, thus producing two separate sections G H in one, the section G being adapted for the passage of hot water and the section H for the passage of cold water, or vice versa. The conduit E is also deflected at intervals in opposite directions, thus producing the series of elbows J J, preserving, however, the separate pipes or sections of the conduit. It will now be seen that the nipples are connected with the outlets of the limbs of the elbows in such manner that they are in the same right line one with the other, whereby when the conduit is applied to the back of the tub the nipples or outlets C properly enter the openings B without requiring other manipulations to fit the nipples or outlets in said openings, the attachment of the spigots or faucets to said nipples being subsequently accomplished in any suitable manner, it being evident that by the construction of the conduit the plumber's work is vastly simplified, and the same is uniform in its nature and may be expeditiously accomplished.

The divisional conduit is preferably formed of cast-iron, but to such material I do not limit myself.

I am aware that it is not new to provide a tube with a longitudinally-extending division or partition therein, thus producing separate sections, and therefore do not claim such feature; but in my case I form the partition of the tube with deflections at intervals in opposite direction, so that the outlets C of the two passages are in the same right line or same plane, and said outlets are in alinement with the openings in the back of a tub, tray, &c., thus avoiding the bending of separate tubes or the overlapping and battering of such tubes when in contact.

Having thus described my invention, what I claim as new, and desire to secure by Letters Patent, is—

1. In a hot and cold water supply, a pipe having a longitudinal partition therein, forming two compartments extending the length thereof, each of said compartments having a series of openings therein, and the pipe being so deflected at intervals, in opposite directions whereby the openings of both series are in the same straight line, said parts being combined substantially as described.

2. As a new article of manufacture, a tube having a longitudinal partition therein forming two separate passages, said partition being formed with deflections at intervals in opposite directions, and said separated passages having outlets in the walls thereof, in the same right line, substantially as described.

3. A hot and cold water supply, consisting of a pipe having a longitudinal partition forming two compartments, each of said compartments having a series of openings therein, and the pipe being deflected at intervals in opposite directions, whereby the openings of both series are in the same straight line, in combination with a tub or tray having openings in its back, corresponding with those of the pipe, said parts being combined, substantially as described.

GEORGE W. CONDERMAN.

Witnesses:
JOHN A. WIEDERSHEIM,
R. H. GRAESER.